US009654684B2

(12) United States Patent
Miyazawa et al.

(10) Patent No.: US 9,654,684 B2
(45) Date of Patent: May 16, 2017

(54) FOCUS ADJUSTMENT DEVICE AND FOCUS ADJUSTMENT METHOD

(71) Applicant: Olympus Corporation, Hachioji-shi, Tokyo (JP)

(72) Inventors: Shingo Miyazawa, Hino (JP); Makoto Ikeda, Kunitachi (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/007,388

(22) Filed: Jan. 27, 2016

(65) Prior Publication Data

US 2016/0234423 A1 Aug. 11, 2016

(30) Foreign Application Priority Data

Feb. 5, 2015 (JP) ................................. 2015-021324

(51) Int. Cl.
*H04N 5/232* (2006.01)
*H04N 5/235* (2006.01)

(52) U.S. Cl.
CPC ......... *H04N 5/23212* (2013.01); *H04N 5/232* (2013.01); *H04N 5/2351* (2013.01); *H04N 5/23261* (2013.01)

(58) Field of Classification Search
CPC .............. H04N 5/23212; H04N 5/232; H04N 5/23261; H04N 5/2351; H04N 5/3696
See application file for complete search history.

(56) References Cited

U.S. PATENT DOCUMENTS

| 8,878,980 B2 | 11/2014 | Ohbuchi et al. | |
| 2007/0086767 A1* | 4/2007 | Nakai | G03B 13/34 396/101 |
| 2010/0123818 A1* | 5/2010 | Ono | H04N 5/23212 348/345 |
| 2012/0162494 A1* | 6/2012 | Nakamura | H04N 5/23212 348/345 |

* cited by examiner

*Primary Examiner* — Tuan Ho
(74) *Attorney, Agent, or Firm* — John C. Pokotylo; Straub & Pokotylo

(57) ABSTRACT

A focus adjustment device for carrying out focus adjustment by moving a focus lens, comprises a point light source determination section which determines a point-like light source subject based on the image signals, an orientation stability determination section which determines stability of orientation by detecting orientation of the focus adjustment device, a photometry section which outputs photometric values corresponding to subject brightness based on the image signals, and a focus adjustment section which carries out a focus adjustment operation using the image signals, based on a determination result of the point light source determination section, wherein the point light source determination section, in a state where a point-like light source subject is currently determined, when a determination result of the orientation stability determination section indicates unstable and a photometric value output from the photometry section does not indicate low brightness, determines that the subject is not a point-like light source.

11 Claims, 8 Drawing Sheets

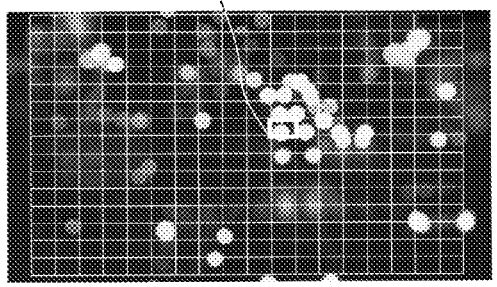
FIG. 2A  AS1
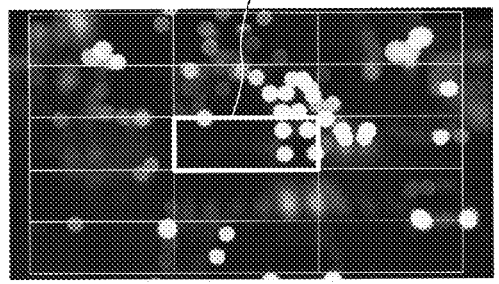
FIG. 2B  AL1
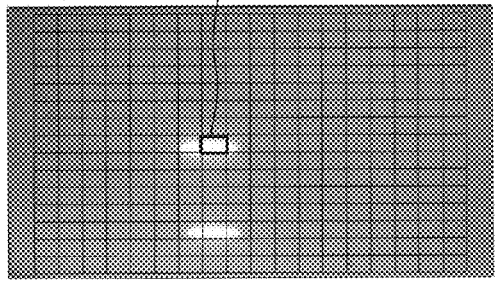
FIG. 2C  AS2
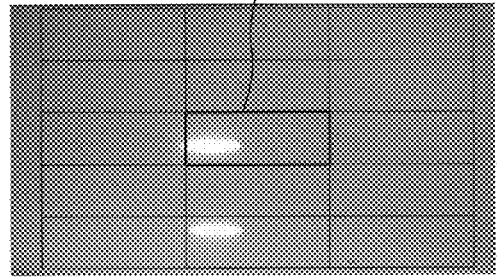
FIG. 2D  AL2
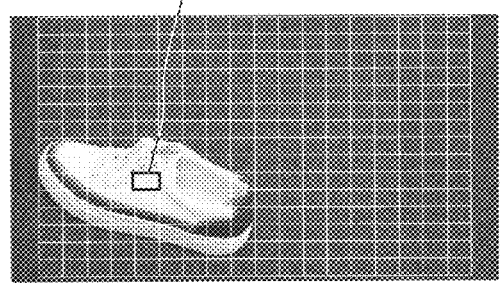
FIG. 2E  AS3
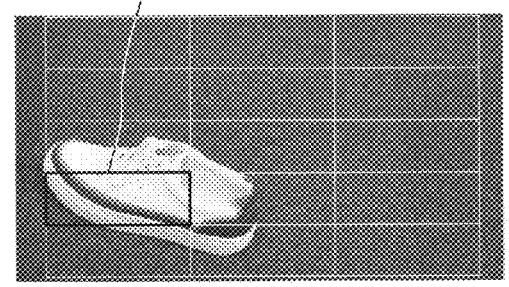
FIG. 2F  AL3

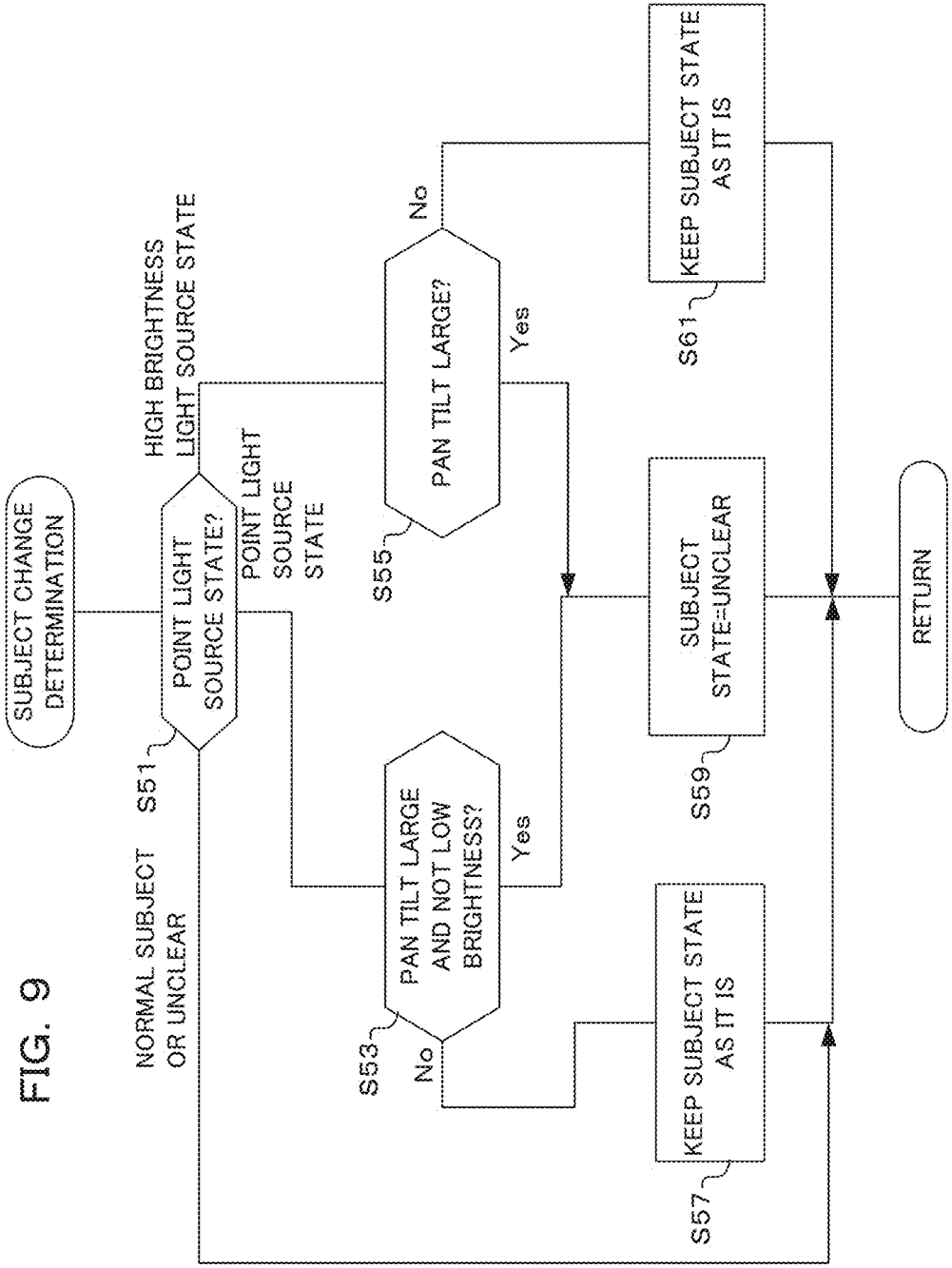

FOCUS ADJUSTMENT DEVICE AND FOCUS ADJUSTMENT METHOD

Benefit is claimed, under 35 U.S.C. §119, to the filing date of prior Japanese Patent Application No. 2015-021324 filed on Feb. 5, 2015. This application is expressly incorporated herein by reference. The scope of the present invention is not limited to any requirements of the specific embodiments described in the application.

BACKGROUND OF THE INVENTION

1. Field of the Invention

The present invention relates to a focus adjustment device and focus adjustment method capable of accurate focus adjustment, even when a point light source or high brightness light source are contained within a subject.

2. Description of the Related Art

If a point light source is contained within a subject, a false focus position will be detected due to the point light source, and carrying out AF (Auto Focus) with good precision is difficult. A focus adjustment device that can carry out AF with good precision even with this type of subject has therefore been proposed. For example, a focus adjustment device that sets multiple partitioned areas, counts high brightness pixels within those areas, determines an area for which that count value is a given value or more as being a point light source subject, and carries out AF in an area, among the multiple partitioned areas, in which a point light source does not exist, is proposed in Japanese patent laid open number 2013-097082 (hereafter referred to as patent publication 1). Also, in this focus adjustment device, in the event that orientation change such as pan or tilt has been detected, the process is performed again from the point light source determination.

In the determination of point light source in patent publication 1 above, without determining the size of a high brightness area there is a possibility of erroneous determination of white portions within a black subject as point light sources, and high brightness areas are searched for in pixel units involving a longer processing time. Also, with patent publication 1, although AF is carried out in an area in which a point light source does not exist, with a video there are cases where point light sources are moving, and there is a possibility that AF precision will be degraded in cases such as illuminations where it is desired to actually take a picture of a subject of point light sources. Further, with patent publication 1, in a case where pan or tilt has been detected, with AF for a movie (hereafter referred to as movie AF) etc. point light source determination is repeated with high frequency resulting in processing load being large, and being a factor in the undermining of AF stability.

A point light source subject or high brightness light source (light source subject such as a fluorescent lamp) are examples of weak subjects with which it is easy to erroneously confirm a false focus position as a focus position when carrying out contrast AF (hill climbing AF). In particular, since the subject changes sequentially in movie AF, due to camera operations such as pan and tilt, and due to movement of the subject, there is a possibility of a point light source subject and a non-point light source changing during the AF operation, and it is necessary to carry out optimum focus adjustment for either case, but the focus adjustment device of the conventional art is insufficient in this regard.

SUMMARY OF THE INVENTION

An object of the present invention is to provide a focus adjustment device and a focus adjustment method that appropriately determine a light source subject, and can appropriately carry out state transition of AF control for the light source subject.

A focus adjustment device of the present invention, for carrying out focus adjustment by moving a focus lens based on image signals of an image sensor for forming a subject image, comprises a point light source determination section which determines a point-like light source subject based on the image signals, an orientation stability determination section which determines stability of orientation by detecting orientation of the focus adjustment device, a photometry section which outputs photometric values corresponding to subject brightness based on the image signals, and a focus adjustment section which carries out a focus adjustment operation using the image signals, based on a determination result of the point light source determination section, wherein the point light source determination section, in a state where a point-like light source subject is currently determined, when a determination result of the orientation stability determination section indicates unstable and a photometric value output from the photometry section does not indicate low brightness, determines that the subject is not a point-like light source.

A focus adjustment method for a focus adjustment device of the present invention, for carrying out focus adjustment by moving a focus lens based on image signals of an image sensor for forming a subject image, comprises determining a point-like light source subject based on the image signals, determining stability of orientation by detecting orientation of the focus adjustment device, outputting photometric values corresponding to subject brightness based on the image signals, and carrying out a focus adjustment operation using the image signals, based on a determination result of the point light source determination section, and wherein at the time of the point light source subject determination, in a state where a point-like light source subject is currently determined, when a determination result of the orientation stability determination section indicates unstable and a photometric value output from the photometry section does not indicate low brightness, it is determined that the subject is not a point-like light source.

BRIEF DESCRIPTION OF THE DRAWINGS

FIG. 2A to FIG. 2F are drawings for explaining the concept of determination for a light source subject, in a camera of one embodiment of the present invention.

FIG. 9 is a flowchart showing a determination operation for subject change, in the camera of one embodiment of the present invention.

DETAILED DESCRIPTION OF THE PREFERRED EMBODIMENTS

An example where a digital camera is adopted as one embodiment of the present invention will be described in the following. This digital camera carries out focus adjustment by causing focus lens movement based on image signals of an image sensor for forming a subject image. A subject image is also subjected to live view display on a display section that is arranged on a rear surface of a camera body, based on image signals from the image sensor. A photographer determines composition and photo opportunity by looking at the live view display. At the time of a release operation image data based on the image signals is stored in a storage medium. Image data that has been stored in the storage medium can be played back and displayed on the display section if playback mode is selected.

Also, in this embodiment, it is determined, at the time of the movie AF, whether a subject is a point light source, a high brightness light source, a normal subject, or unclear. A bright point under conditions of low brightness, such as a night scene, is determined as a point light source, and a high brightness subject such as a fluorescent lamp within a room is determined as a high brightness light source. Also, focus adjustment is carried out by selecting either of three AF control states, in accordance with contrast and focus level of the subject, namely a search state, a wob (wobbling) state or a standby state. The wob state is a control state where focus position is detected using variation in focus evaluation value (contrast value) while moving a focus lens backwards and forwards in the optical axis direction by microscopic amounts within a depth of field.

Figure 1:
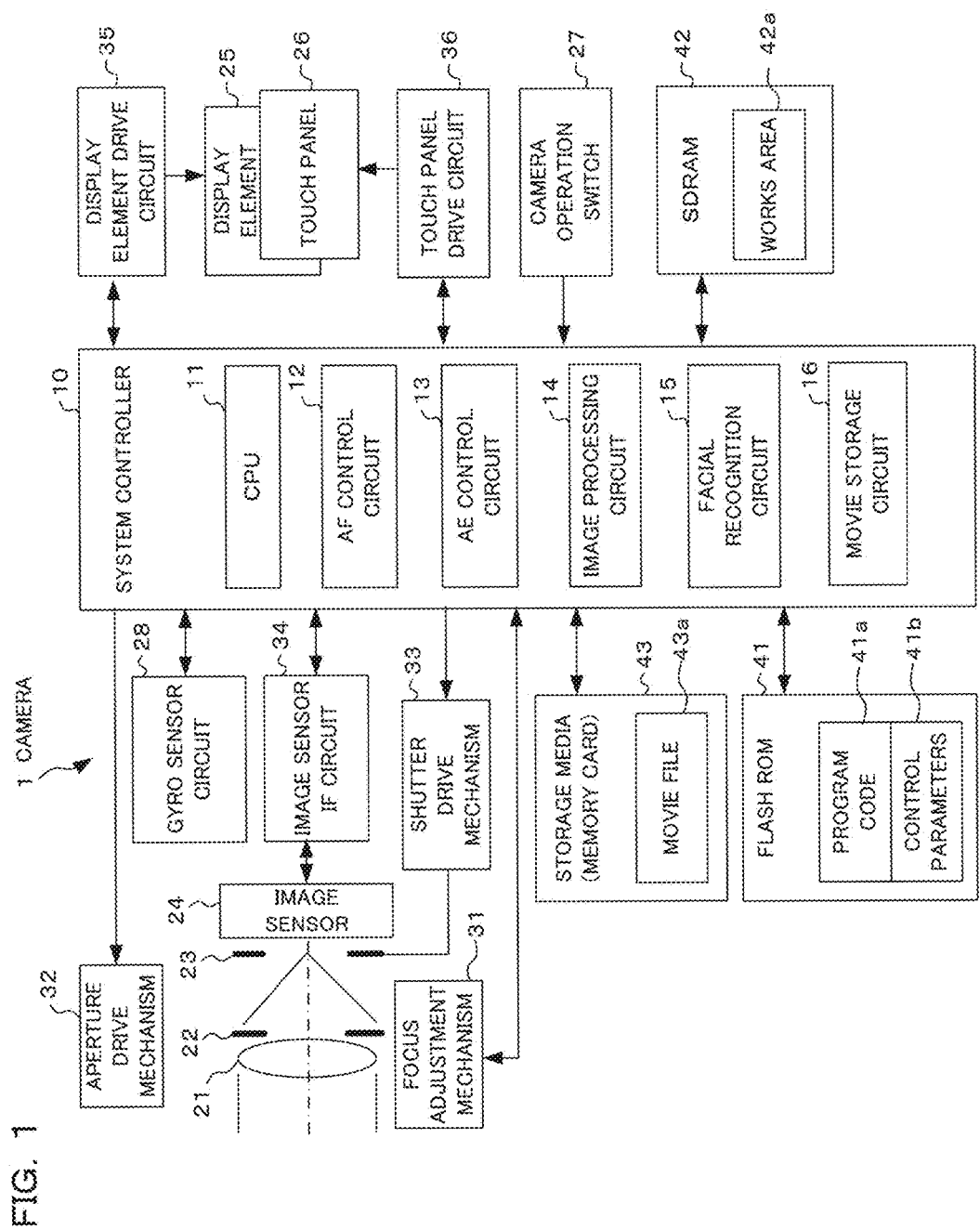
FIG. 1 is a block diagram mainly showing the electrical structure of a camera of one embodiment of the present invention.

FIG. 1 is a block diagram mainly showing the electrical structure of the camera of this embodiment. This camera comprises a system controller 10, a lens group 21, an aperture 22, a shutter 23, an image sensor 24, a display element 25, a touch panel 26, a camera operation switch 27, a gyro sensor circuit 28, a focus adjustment mechanism 31, an aperture drive mechanism 32, a shutter drive mechanism 33, an image sensor IF circuit 34, a display element drive circuit 35, a touch panel drive circuit 36, a flash ROM 41, an SDRAM 42, and storage media 43.

The lens group 21 includes a focus lens for adjusting focus, and has a plurality of optical lenses. Focus of an image of a subject formed on the image sensor 24 is adjusted by moving the focus lens in the optical axis direction. The aperture 22 adjusts amount of light that is incident on the image sensor 24 through the lens group 21, by varying opening diameter. An optical system including the lens group 21 and the aperture 22 etc. may be constructed as an interchangeable lens that can be attached to and detached from a body of the camera 1.

The shutter 23 is provided on a front surface of the image sensor 24, and controls incidence of light onto the image sensor 24 through the lens group 21, by passing or blocking subject light flux. The image sensor 24 includes, for example, a CCD image sensor or a CMOS image sensor. The image sensor 24 creates image signals by photoelectric conversion, based on a subject image that has been formed by the lens group 21.

Under the control of the system controller 10, the focus adjustment mechanism 31 moves the focus lens that is included in the lens group 22 in the optical axis direction, in order to adjust focus. The aperture drive mechanism 32 drives opening diameter of the aperture 22 under control of the system controller 10. The shutter drive mechanism 33 drives the shutter 23 under control of the system controller 10. The image sensor IF circuit 34 reads out image signals from the image sensor 24 and outputs image data that has been converted to digital signals to the system controller 10.

The display element 25 includes, for example, a liquid crystal display. The display element 25 displays various images, such as a live view image, a playback image of an already taken image, or an operation screen etc. The touch panel 26 is provided on the display element 25, and acquires touch input by a user. The display element drive circuit 35 controls display operation by the display element 25, under control of the system controller 10. The touch panel drive circuit 36 controls acquisition of touch input by the touch panel 26, under control of the system controller 10.

The camera operation switch 27 includes, for example, a release switch, a record button for movie, and a cross-shaped key for performing various inputs. If the camera operation switch 27 is operated by the user, that operating state is transmitted to the system controller 10.

The gyro sensor circuit 28 detects orientation of the camera. The gyro sensor circuit 28 transmits information regarding camera orientation to the system controller 10. The system controller 10 (particularly a CPU 11) and the gyro sensor circuit 28 function as an orientation stability determination section for determining stability of orientation by detecting orientation of the focus adjustment device (camera) (refer for example, to S53 and S55 in FIG. 9).

The flash ROM 41 is a non-volatile electrically rewritable memory, and stores program code 41a and control parameters 41b for controlling camera operation that are used by the system controller 10. The SDRAM 42 is an electrically rewritable volatile memory, and provides a works area 42a, which is a storage area used in operations by the system controller 10. The storage media 43 can be fitted into and taken out of the camera, and stores data of still images, and movie files 43a, that have been taken by the camera.

The system controller 10 includes a central processing unit (CPU) 11, an AF control circuit 12, an AE control circuit 13, an image processing circuit 14, a facial recognition circuit 15, and a movie storage circuit 16. It should be noted that the AF control circuit 12, AE control circuit 13, image processing circuit 14, facial recognition circuit 15, movie storage circuit 16 etc. may be constructed as an application specific integrated circuit (ASIC) or digital signal processor (DSP).

The CPU 11 carries out various operations using the program code 41a and control parameters 41b that have been stored in the flash ROM 41.

The AF control circuit 12 carries out various operations related to autofocus (AF) and controls operation of the focus adjustment mechanism 31 etc. Specifically, the AF control circuit 12 calculates AF evaluation value based on high frequency components of image data from the image sensor 24, and controls operation of the focus adjustment mechanism 31 so that this AF evaluation value becomes a peak. The AF control circuit 12 and the CPU 11 function as a focus adjustment section for carrying out a focus adjustment operation using the image signals, based on a determination result of the point light source determination section.

The AE control circuit 13 carries out various operations related to exposure control, and controls operation of the aperture drive mechanism 32 and the shutter drive mechanism 33 etc. Specifically, subject brightness is calculated based on image data from the image sensor 24. Based on this calculated subject brightness an aperture value, shutter speed value and ISO sensitivity etc. to give optimum exposure are calculated, and control of the aperture drive mechanism 32 (aperture value control), shutter drive mechanism 33 (shutter speed control), and image sensor IF circuit 34 (ISO sensitivity) are carried out. The AE control circuit 13 functions as a photometry section for outputting a photometric value corresponding to subject brightness based on the image signals.

Also, the AE control circuit 13 acquires brightness values of finely divided photometry areas and brightness values of coarsely divided photometry areas, that will be described later using FIG. 2A to FIG. 4. Maximum brightness value, minimum brightness value and average brightness value are then obtained for the finely divided photometry areas. Maximum brightness value and minimum brightness value are also obtained for the coarsely divided photometry areas. It should be noted that brightness values for each of the finely divided photometry areas and the coarsely divided photometry areas may also be obtained in the image sensor IF circuit 34 and the image processing circuit 14 etc. as well as the AE control circuit 13. Accordingly, regarding image signals, the above described photometry section has a divided area setting section for setting first divided areas (finely divided photometry areas) and second divided areas that have larger area than the first divided regions (coarsely divided photometry areas), and a photometric value calculation section for calculating first photometric values based on first image signals corresponding to the first divided areas, and second photometric values based on image signals corresponding to the second divided areas.

Figure 7:
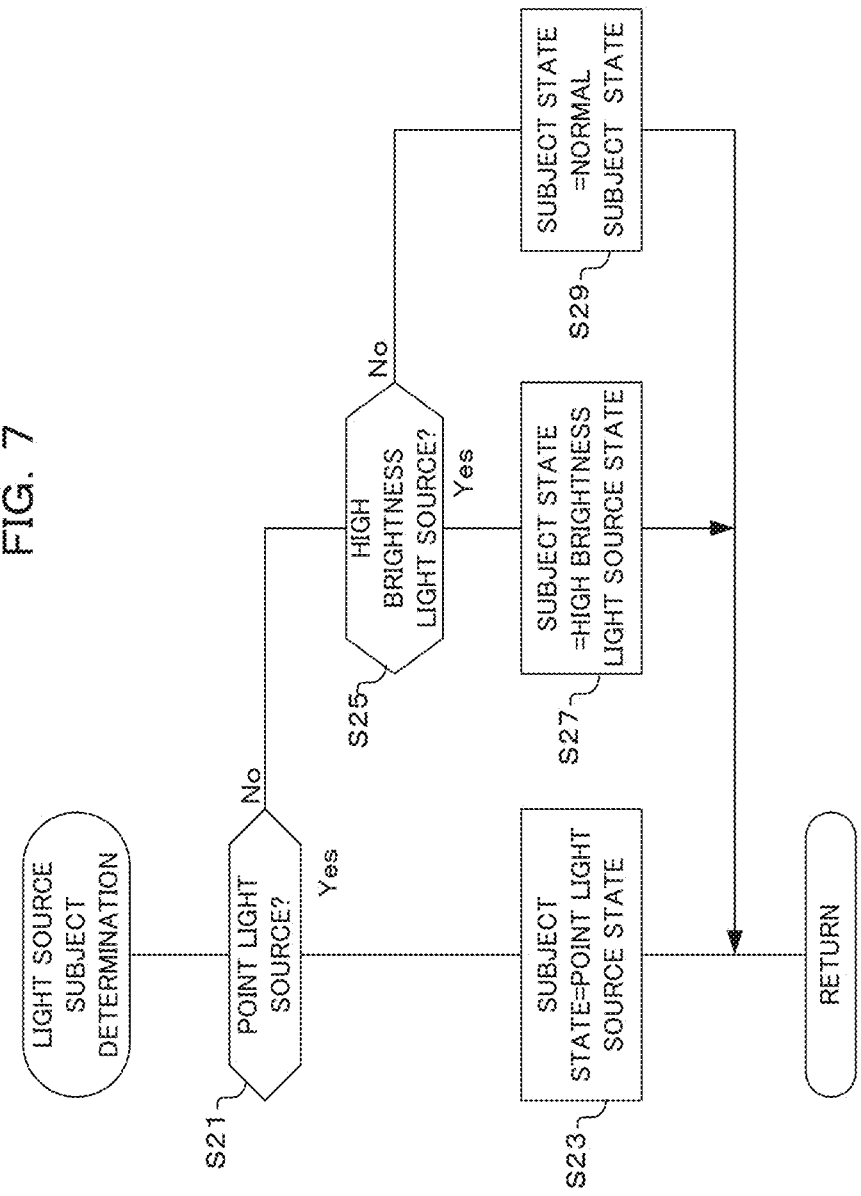
FIG. 7 is a flowchart showing a determination operation for light source subject, in the camera of one embodiment of the present invention.

The AE control circuit 13 and the CPU 11 function as a point light source determination section for determining a point-like light source subject based on image signals (refer, for example, to S21 and S23 in FIG. 7). This point light source determination section, in a state where a point-like light source subject is currently determined, when a determination result of the orientation stability determination section indicates unstable and a photometric value output from the photometry section does not indicate low brightness, determines that the subject is not a point-like light source (refer, for example, to S31 Yes, S33 and S41 in FIG. 8). The point light source determination section determines whether or not there is a point light source subject based on the first photometric values and the second photometric values (refer, for example, to S21 in FIG. 7). The point light source determination section sets threshold values in accordance with a maximum value and minimum value from among a plurality of first photometric values (for example, photometric values of the finely divided photometry areas) (refer, for example, to equation (2) which will be described later), and in a case where the second photometric values (for example, photometric values of coarsely divided photometry areas) represent a lower brightness than a threshold value determines a point light source subject (refer to S21 in FIG. 7, for example).

Also, with this embodiment, there is a standby state in which focus detection is carried out with the focus lens being stopped and subject variation is monitored (refer to FIG. 5B, for example), and the point light source determination section determines that it is no longer a point-like light source subject (refer, for example, to S31 Yes, S33, S39 and S41 in FIG. 8) when a state where output of the photometry section does not indicate low brightness continues for a given time or longer while in the standby state, and in a state where it is currently determined that the subject is a point-like light source subject.

Also, the AE control circuit 13 and the CPU 11 function as a non-point light source determination section for determining that it is not a point-like light source based on image signals, and this non-point light source determination section determines that it is not a point-like light source subject (refer, for example, to S25 and S27 in FIG. 7), when a difference between a maximum value and an average value, among a plurality of first photometric values, is larger than a given value (refer, for example, to equation (3) which will be described later).

The image processing circuit 14 subjects image data, that has been generated by the image sensor 24 and acquired by means of the image sensor IF circuit 34, to image processing. The facial recognition circuit 15 carries out facial recognition processing to recognize a face included in a subject that has been taken by the image sensor 24. The movie storage circuit 16 stores movie data, that has been generated by the image sensor 24, acquired by means of the image sensor IF circuit 34 and subjected to image processing by the image processing circuit 14, in the storage media 43.

An overview of a light source determination method of this embodiment will be described using FIG. 2A to FIG. 2F. Determination of light source subject in this embodiment is the performing of determination as to whether there is a point light source subject, a high brightness light source subject or a subject other than these using a plurality of divided photometry areas (hereafter referred to as finely divided photometry areas (refer to FIG. 2A, FIG. 2C and FIG. 2E)) and divided photometry areas that are larger than the plurality of divided areas (hereafter referred to as coarsely divided photometry areas (refer to FIG. 2B, FIG. 2D, and FIG. 2F)). Specifically, FIG. 2A to FIG. 2F show subject images that have been taken by the image sensor 24, with each of the rectangles in FIG. 2A, FIG. 2C, and FIG. 2E respectively representing finely divided photometry areas, and each of the rectangles in FIG. 2B, FIG. 2D, and FIG. 2F respectively representing coarsely divided photometry areas.

For example, in a case where one area AS1 of the finely divided photometry areas is high brightness, as shown in FIG. 2A, and a coarsely divided photometry area AL1 containing the finely divided photometry area AS1 is not high brightness, as shown in FIG. 2B, a point light source is determined. Similarly, in a case where one of the areas AS2 of the finely divided photometry areas is high brightness, as shown in FIG. 2C, and a coarsely divided photometry area AL2 that contains the finely divided photometry area AS2 is not high brightness, as shown in FIG. 2D, a point light source is determined.

On the other hand, in a case where one of the areas AS3 of the finely divided photometry areas is high brightness, as shown in FIG. 2E, and a coarsely divided photometry area AL3 that contains the finely divided photometry area AS3 is high brightness, as shown in FIG. 2F, a non-light source subject is determined (it is not determined to be a point light source).

Figure 3:
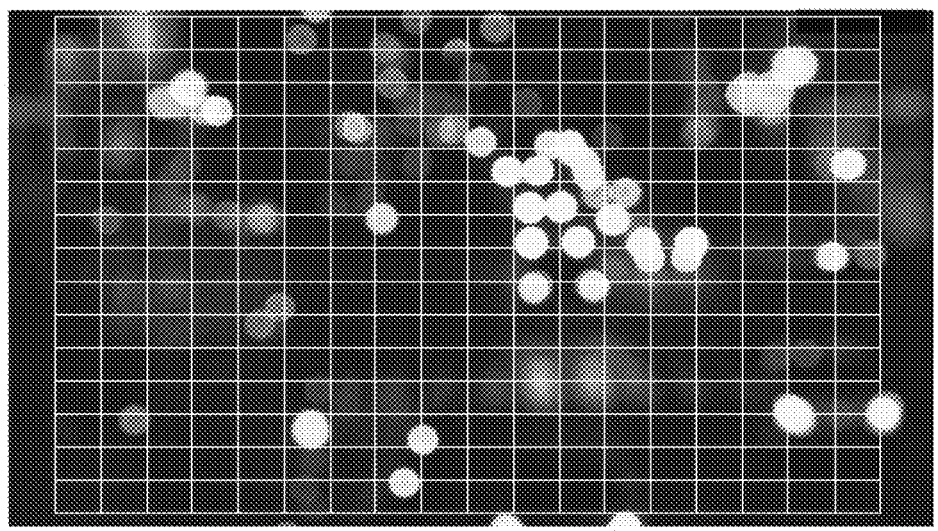
FIG. 3 is a drawing showing finely divided photometry areas, in the camera of one embodiment of the present invention.

Arrangement of the plurality of divided photometry areas will be described using FIG. 3 and FIG. 4A to FIG. 4C. FIG. 3 shows an example of finely divided photometry areas. In FIG. 3, each rectangle is a finely divided photometry area, and the greater the division number for the finely divided photometry areas, the easier it becomes to detect smaller point light sources. However, increasing the number of divisions increases computation load in the software, and makes hardware structures more complicated. The division number should therefore be determined in view of these circumstances. With the example shown in FIG. 3, areas are divided into 18×15 for an aspect ratio of 16:9. The finely divided photometry areas may also be arranged so as to cover the whole of a shooting range.

Figure 4A:
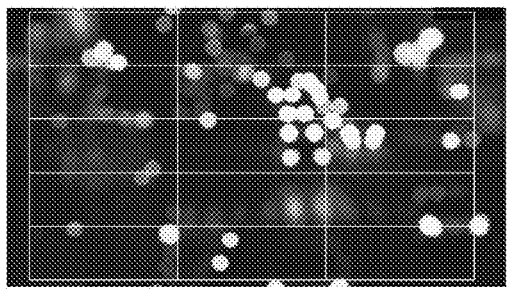
FIG. 4A to FIG. 4C are drawings showing coarsely divided photometry areas, in the camera of one embodiment of the present invention.
Figure 4B:
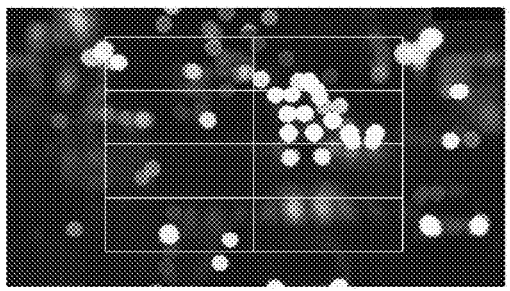
Figure 4C:
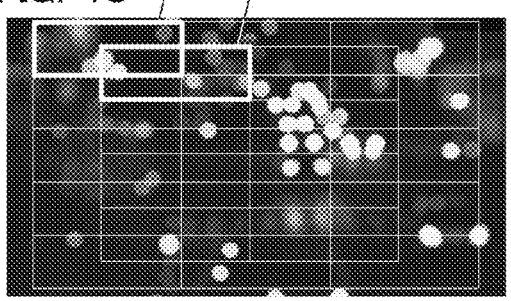

FIG. 4A to FIG. 4C show arrangement examples of the coarsely divided photometry areas. The division number for the coarsely divided photometry areas is smaller since division is coarser than that for the finely divided photometry areas. However, if the division number is too course a common subject that is whitish may be determined as a light source, so division number must be appropriately set. In FIG. 4A the screen is divided into 3×5, and the coarsely divided photometry areas are 18 times larger than the finely divided photometry areas. Also, the example shown in FIG. 4B is an example in which the coarsely divided photometry areas are arranged 2×4.

Also, besides the examples shown in FIG. 4A and FIG. 4B, arrangements of the coarsely divided photometry areas may also be such that the coarsely divided photometry areas overlap, as shown in FIG. 4C. With the example shown in FIG. 4C, the widths of the coarsely divided photometry area AL4 and the coarsely divided photometry area AL5 are the same, and they are partially overlapping.

Figure 5A:
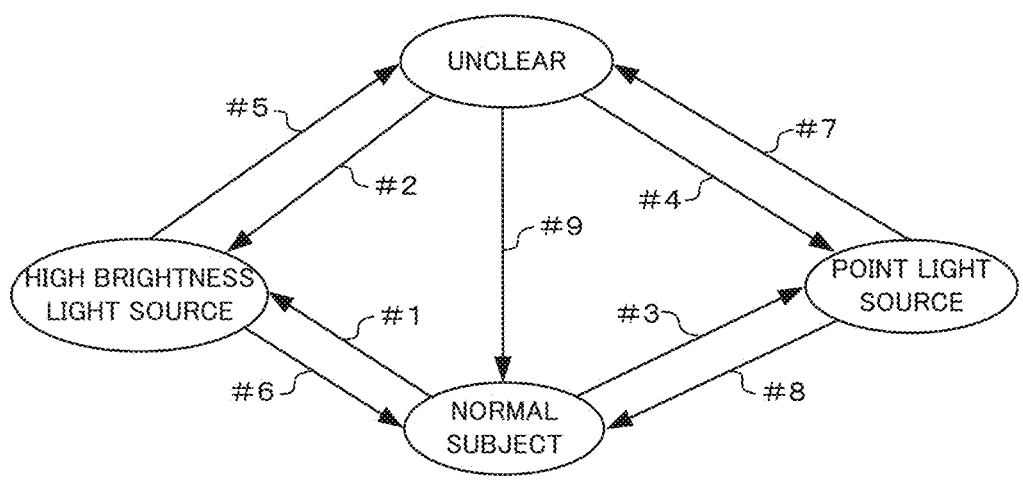
FIG. 5A and FIG. 5B are state transition diagrams for the camera of one embodiment of the present invention, with FIG. 5A being a state transition diagram for subject states, and FIG. 5B being a state transition diagram for AF control states.
Figure 5B:
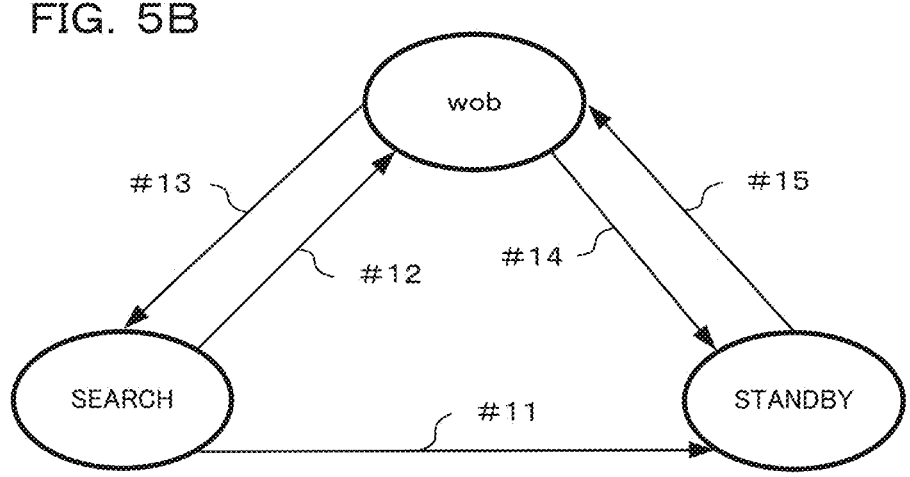

Next, an overview of state transition will be described using FIG. 5A and FIG. 5B. FIG. 5A is a state transition diagram for subject state, and FIG. 5B is a state transition diagram for AF control state. State transition for subject state and state transition for AF control state are executed in parallel.

With a movie, subject states vary sequentially due to camera operation and subject movement etc., and tracking this varying subject with good stability and precision is required in movie AF. With this embodiment therefore, in order to carry out stable AF for a point light source or high brightness light source subject, four states are assumed, as shown in FIG. 5A, transitioning is performed between these states, and optimum processing is carried out in respective states.

Details of determination of each subject state will be described later, but briefly there are four subject states, namely high brightness light source, point light source, normal subject and unclear. If a result of the light source subject determination is high brightness light source when unclear or normal subject are the subject state, there is a transition to high brightness light source, as shown by state transitions #1 and #2. Also, if a result of the light source subject determination is point light source when unclear or normal subject are the subject state, there is a transition to point light source as shown by state transitions #3 and #4.

Also, if high brightness light source subject change determination is confirmed in a case where high brightness light source is the subject state, there is a transition to unclear, as shown by transition #5. If high brightness light source disengagement determination is confirmed in a case where high brightness light source is the subject state, there is a transition to normal subject, as shown by transition #6.

Also, if point light source subject change determination is confirmed in a case where point light source is the subject state, there is a transition to unclear, as shown by transition #7. If point light source disengagement determination is confirmed in a case where point light source is the subject state, there is a transition to normal subject, as shown by transition #8.

Also, when the subject state is unclear, if N frames elapse in the unclear state there is a transition to normal subject, as shown by state transition #9.

FIG. 5B shows state transitions for AF control state, performed in parallel with state transitions for subject state. There are three AF control states, namely the search state, wob state, and standby state. The search state is a state where the focus lens is moved between the infinity end and the close-up end in order to detect a peak of AF evaluation value. Also, the wob state is a state where the focus lens is moved by microscopic amounts forward and backwards in the optical axis direction within the depth of field. The standby state is a state where neither search nor wob control are carried out.

In the event that a focus position being reached has been detected based on the AF evaluation value when in the search state, the standby state is entered, as shown by the state transition #11. Also, if the AF evaluation value being close to a peak has been detected when in the search state, the wob state is entered, as shown by state transition #12.

If the fact that peak position is distant has been detected based on the AF evaluation value when in the wob state, the search state is entered, as shown by the state transition #13. In the event that a focus position being reached has been detected based on the AF evaluation value when in the wob state, the standby state is entered, as shown by the state transition #14. Also, if change detection is carried out based on the AF evaluation value when in the standby state, the wob state is entered, as shown by state transition #15.

Next, operation of the subject state determination will be described using the flowchart shown in FIG. 6. This flow is executed by the CPU 11 controlling respective circuits and respective mechanisms within the camera, based on program code 41a stored in the flash ROM 41. This also applies to the flowcharts shown in FIG. 7 to FIG. 9.

The overall flow for subject state determination is launched once image data for a single frame is input the image sensor 24. Once the flow has been launched, first, brightness of the finely divided photometry areas is acquired (S1). Here, the AE control circuit 13 acquires brightness values for each of the finely divided photometry areas such as was shown in FIG. 2A, FIG. 2C, FIG. 2E or FIG. 3 based on image data that has been read out from the image sensor 24.

If brightness values for the finely divided photometry areas have been acquired, next brightness values for the coarsely divided photometry areas are acquired (S3). Here, the AE control circuit 13 acquires brightness values for each of the coarsely divided photometry areas such as was shown in FIG. 2B, FIG. 2D, FIG. 2F or FIG. 4A to FIG. 4C based on image data that has been read out from the image sensor 24.

If brightness values for the coarsely divided photometry areas have been acquired, next maximum, minimum and average brightness are acquired for the finely divided photometry areas (S5). Here, the AE control circuit 13 or the CPU 11 obtains maximum brightness value, minimum brightness value, and average brightness value based on the brightness values for the finely divided photometry areas that were acquired in step S1.

If maximum, minimum and average brightness for the finely divided photometry areas have been acquired, next maximum, minimum and average brightness are acquired for the coarsely divided photometry areas (S7). Here, the AE control circuit 13 or the CPU 11 obtains maximum brightness value and minimum brightness value based on the brightness values for the coarsely divided photometry areas that were acquired in step S3.

If maximum and minimum brightness have been acquired for the coarsely divided photometry areas, next subject change determination is carried out (S9). Here, in the case of the point light source state and the high brightness light source state, the CPU 11 determines whether or not there has been change in the subject (refer to state transitions #5 and #6 in FIG. 5A). The initial state is the unclear state, and in the case of the unclear state this determination is effectively not performed. Detailed operation of this subject change determination will be described later using FIG. 9.

If subject change determination has been carried out, it is next determined whether or not determination is feasible (S11). Here it is determined whether it is possible to carry out the determination of steps S15 and S19, which will be described later. Here, it is determined whether it is possible to carry out the determination if either of the following conditions (i) to (iii) is satisfied.

(i) The subject state is unclear.
(ii) The subject state is the normal subject state, and a fixed time period has elapsed
(iii) The subject state is either point light source or high brightness light source state, it is a standby phase, and a fixed time period has elapsed.

It should be noted that here, a fixed time period having elapsed means a case where image data of predetermined N frames are readout after setting subject state. The image sensor 24 is read out at specified time intervals.

Next, if the result of determination in step S11 is that execution of determination is possible, it is next determined whether or not it is a normal subject state or an unclear state (S13). The initial state is the unclear state, and in the light source subject determination in step S15, which will be described later, subject state is set to either point light source, high brightness light source, or normal subject. In this step determination is based on the subject state that has been set.

If the result of determination in step S13 is the normal subject state or the unclear state, next light source subject determination is carried out (S15). Here, it is determined whether or not there is a point light source, a high brightness light source, or a normal subject using the maximum and minimum brightness values within the finely divided photometry areas and within the coarsely divided photometry areas that were obtained in steps S5 and S7. Detailed operation of this light source subject determination will be described later using FIG. 7.

If the result of determination in step S13 is that it is neither the normal subject state or the unclear state, it is next determined whether or not it is the standby state (refer to FIG. 5B) (S17). Here determination is based on the AF control state.

If the result of determination in step S17 is that it is the standby state, disengagement determination is carried out (S19). While being focused and in the standby state, in the event that there is no longer a point light source within the subject image, or there is no longer a high brightness light source, if this state continues for a given time, there is shift to a normal subject state by disengaging from the point light source state or the high brightness light source state. Detailed operation of this disengagement determination will be described later using FIG. 8.

If the result of determination in step S11 is that determination is not feasible, or if the result of determination in step S17 is not the standby state, or if light source subject determination has been carried out in step S15, or if disengagement determination has been carried out in S19, the flow for subject state determination is terminated. Then, if image data for the next frame is input from the image sensor 24 determination of the subject state commences again. With this embodiment, determination of subject state is carried out for every frame, but determination of subject state may also be carried out every few frames.

Next, the light source subject determination of step S15 will be described using the flowchart shown in FIG. 7. If the flow for light source subject determination is entered, it is first determined whether or not there is a point light source (S21). Regarding whether or not there is a point light source, a point light source subject is determined when the three conditions (iv) to (vi) below have been satisfied, that is, when an AND condition has been satisfied.

(iv) At the time of low brightness

With this embodiment, a time of low brightness is determined when an average brightness of the finely divided photometry areas is lower than BV0, for example.

(v) When in-screen brightness difference is large

With this embodiment, equation (1) below is computed, that is average brightness value (BVave) for the finely divided photometry areas is subtracted from maximum brightness (BVmax) of the finely divided photometry areas, and it is determined that in-screen brightness difference is large when this subtraction value is larger than a 2.5 step. It should be noted that a 2.5 step is an example, and a value that is larger or smaller than this value may be used as long as it is a value that enables determination that in-screen brightness difference is large.

$$BV\text{max} - BV\text{ave} > 2.5 \quad (1)$$

(vi) When a high brightness area is small

With this embodiment, it is determined that a high brightness area is small when there is no area in which a light source subject determination brightness TH is exceeded within the coarsely divided photometry areas. Here, light source subject determination brightness TH is calculated from equation (2) below.

$$TH = BV\text{min} + (BV\text{max} - BV\text{min}) \times 0.8 \quad (2)$$

It should be noted that here BVmin is a minimum brightness value for the finely divided photometry areas, and BVmax is a maximum brightness value for the finely divided photometry areas.

With equation (2) above, the larger a difference between maximum brightness value BVmax and minimum brightness value BVmin, the lower light source subject determination brightness TH is. As a result, it is made easy to detect that TH has been exceeded within the finely divided photometry areas, and made difficult to detect that a brightness value becomes lower than TH within the coarsely divided photometry areas. At the time of backlighting there is a tendency for brightness difference to become large (Brightness value By for outdoor lighting, sunlight etc. becomes considerably higher than brightness value By for a point light source), and light source subject determination is not carried out at the time of backlighting.

If the result of determination in step S21 is that all of the above described conditions (iv) to (vi) have been satisfied, a point light source is determined, and the subject state is set to the point light source state (S23).

On the other hand, if the result of determination in step S21 is that any of the above described conditions (iv) to (vi) have not been satisfied, it is next determined whether or not there is a high brightness light source (S25). Regarding whether or not there is a high brightness light source, a high brightness light source subject is determined when the two conditions (vii) to (viii) below have been satisfied, that is, when an AND condition has been satisfied.

(vii) When in-screen brightness difference is large

With this embodiment, equation (3) below is computed, that is average brightness value (BVave) for the finely divided photometry areas is subtracted from maximum brightness (BVmax) of the finely divided photometry areas, and it is determined that in-screen brightness difference is large when this subtraction value is larger than a 3.5 step. It should be noted that a 3.5 step is an example, and a value that is larger or smaller than this value may be used as long as it is a value that enables determination that in-screen brightness difference is large, but is preferably larger than the step for the determination of equation (1) above (with the above example, 2.5).

$$BVmax - BVave > 3.5 \quad (3)$$

(viii) When a high brightness area is small

With this embodiment, similarly to condition (vi) above, it is determined that a high brightness area is small when there is no area in which a light source subject determination brightness TH is exceeded within the coarsely divided photometry areas. Here, the light source subject determination brightness TH is the same as for equation (2) above.

$$TH = BVmin + (BVmax - BVmin) \times 0.8 \quad (2)$$

If the result of determination in step S25 is that both of the above described conditions (vii) to (viii) have been satisfied, a high brightness light source is determined, and the subject state is set to the high brightness light source state (S27).

On the other hand, if the result of determination in step S25 is that either of the above conditions (vii) and (viii) is not satisfied, the normal subject state is determined and the subject state is set to normal subject state (S29).

Once the subject state has been set in step S23, S27 or S29, the originating flow is returned to.

Next, the disengagement determination of step S19 (refer to FIG. 6) will be described using the flowchart shown in FIG. 8. This disengagement determination is determination at a constant period (for example, every time image data for a single frame is read out from the image sensor 24, or every N frames), when the AF control state shown in FIG. 5B has entered the standby state. In this disengagement determination flow, when a disengagement counter, which will be described later, has been counted up more than THa, there is a transition to the normal subject state by disengaging from the point light source state or the high brightness light source state. This disengagement counter is reset when the standby state is entered.

If the flow for disengagement determination is entered, it is first determined whether or not it is a point light source state (S31). The point light source state is set in step S23. In this step it is determined whether or not the point light source state is currently set.

If the result of determination in step S31 is that it is the point light source state, it is next determined whether or not a count up condition for point light source has been satisfied (S33). Here, the disengagement counter is incremented when a condition of not low brightness is satisfied. With this embodiment, not low brightness is determined when an average brightness (BVave) of the finely divided photometry areas is greater than or equal to Bv1. It is possible to allow hysteresis by setting an average brightness to 1 step brighter than the determination condition (iv) for the case of point light source for step S21 described above.

If the result of determination in step S31 is that it is not the point light source state, namely that it is the high brightness light source, it is next determined whether or not a count up condition for high brightness light source state has been satisfied (S35). Here, the disengagement counter is incremented when a condition of in-screen brightness difference being small is satisfied. This is because there is a condition that in-screen brightness difference is large, mentioned in (vii) described above in the determination conditions for high brightness light source subject of the light source subject determination.

With this embodiment, average brightness value (BVave) for the finely divided photometry areas is subtracted from maximum brightness (BVmax) of the finely divided photometry areas, as shown by equation (4) below, and it is determined that in-screen brightness difference is small when this subtraction value is less than or equal to a 2.8 step. It should be noted that about 2.8 is an example, and a value that is larger or smaller than this value may be used as long as it is a value that enables determination that in-screen brightness difference is small. With this embodiment, hysteresis is allowed by setting a subtraction value to a value that is a 0.7 (3.5–2.8) step darker than the determination condition of determination condition (vii) for the case of point light source in step S25 described above.

$$BVmax - BVave \leq 2.8 \quad (4)$$

If the result of determination in step S33 or S35 is that the count up condition has been satisfied, counting up of the disengagement counter is carried out (S37). Counting up is not carried out together for the case of the point light source state and the case of the high brightness light source state, but counting is carried out separately. If this counting up has been carried out, or if the result of determination in step S33 or S35 is that the counter condition has not been satisfied, it is determined whether or not the counter value has exceeded the determination value THa (S39).

If the result of determination in step S39 is that the counter value has exceeded the determination value THa, then the subject state is set to the normal subject state (S41). If the standby state is entered in the point light source state or the high brightness light source state, then in the event that the result of determination in step S33 or S35 continues for a given number of times, the point light source state or high brightness light source state is disengaged and the normal subject state is set.

On the other hand, if the result of determination in step S39 is that the counter value has not exceeded the determination value THa, then the subject state is kept as it is (S43). As a result, the subject state is maintained at the point light source state or the high brightness light source state.

Once the subject state has been set in step S41, or S43, the originating flow is returned to.

Next, the subject change determination of step S9 (refer to FIG. 6) will be described using the flowchart shown in FIG. 9. It should be noted that in the case where subject change determination is carried out in the initial state, since the subject state is "unclear", as the result of determination in step S51, the flow shown in FIG. 9 is effectively not executed (S51 determination: unclear).

In the event that the subject state is point light source or high brightness light source, if a means of determination is only the disengagement determination of step S19, it is not possible to disengage that state with other than a standby phase. Under these circumstances, in cases such as when a camera is moving frequently such as at the time of hand-held shooting, if a point light source or high brightness light source is erroneously determined once, that state will continue endlessly.

Accordingly, in a case where pan or tilt is detected and conditions for subject change determination have been satisfied, it is assumed that there has been movement from a subject which has been determined as a point light source or high brightness light source to another subject, and the subject state is made "unclear". Also, this time, the AF control state transitions to the wob state, and wobbling drive is commenced. In the flow of FIG. 9, when carrying out subject change determination, the determination is carried with different content for the point light source state and the high brightness light source state.

If the flow for subject change determination is entered, it is first determined whether or not it is a point light source state (S51). The point light source state is set in step S23. In this step it is determined whether or not the point light source state is currently set, and in the case of the point light source state there is a transfer to S53, while in the case of the high brightness light source state there is a transfer to S55. Also, in the case of a normal subject or unclear, no processing is executed and there is a transfer to RETURN.

If the result of determination in step S51 is the point light source state, it is determined whether pan or tilt is large, and whether there is not low brightness (S53). This determination is carried out for every given number of frame in the case of the point light source state. In this step, it is determined whether or not there is panning, where the camera swings left and right by greater than or equal to a given amount, or tilt, where the camera swings up and down by greater than or equal to a given amount, based on detection signals from the gyro sensor circuit 28. It is also determined whether a brightness value is not lower than a given value. With this determination, it is determined that it is not low brightness when an average brightness value BVave of the finely divided photometry areas is greater than or equal to BV1.

On the other hand, if the result of determination in step S51 is that it is not the point light source state, in the case of a high brightness light source state it is determined whether or not plan or tilt is large (S55). The high brightness light source state is set in step S25. This determination is carried out for every frame in the case of the high brightness light source state. In this step, similarly to step S53, it is determined whether or not there is panning, where the camera swings left and right by greater than or equal to a given amount, or tilt, where the camera swings up and down by greater than or equal to a given amount, based on detection signals from the gyro sensor circuit 28.

If the result of determination in step S53 is that pan or tilt is large and it is not low brightness, or if the result of determination in step S55 is that pan or tilt is large, then the subject state is set to unclear (S59). In the event that these determination results are Yes, then since the subject state has changed from the point light source state or the high brightness light source state, the subject state is set to "unclear". In the event that "unclear" has been set, the previously described step S9 in FIG. 6 is returned to, and in step S15 light source subject determination is carried out, and a subject state of either the point light source state, the high brightness light source state, or the normal subject state is set (refer to FIG. 7).

On the other hand, if the result of determination in step S53, regarding pan and tilt being large and it not being low brightness, is No, then the subject state is kept at it is (S57), and similarly, if the result of determination in step S55 is not that pan or tilt are large also, the subject state is kept as it is (S61).

Once the subject state has been set in steps S57, S59 and S61, or if the result of determination in step S51 was "unclear", the flow for subject change determination is terminated and the originating flow is returned to.

Next, light source subject countermeasure processing will be described. At the time of carrying out AF using the flow shown in FIG. 6 to FIG. 9 described previously, it is possible to detect a point light source or high brightness light source, which are problematic subjects. In the event that such a problematic subject has been detected, AF control such as (ix) to (xi) described in the following is carried out. Some or all of (ix) to (xi) below may be adopted. Executing all of the processes is more effective.

(ix) Set cutoff frequency coefficients for HPP (high pass filter) for point light source and for high brightness light source.

Cutoff frequencies for high pass filters are set to a frequency of twice the frequency that is currently set. For example, in a case where two high pass filters, namely HPF1 and HPF2, are provided, maximum values for cutoff frequencies that are respectively set may be clipped.

(x) Make AF area size large.

The AF control circuit 12 calculates AF evaluation values for a given area from within image data from the image sensor 24, and carries out AF control. In the case of a point light source subject or a high brightness light source subject, which are problematic subjects, the size of this area is changed.

(xi) Carry out squared brightness correction on AF evaluation value.

Specifically, correct AF evaluation value using equation (5) below.

$$AFval\_correct\_ilm = Afval\_raw \times \left(\frac{Y\_nor}{Y\_now}\right)^2 \times \frac{area\_size\_nor}{area\_size} \div K \quad (5)$$

Here,

AFval_correct_ilm: value of Afval_raw that has been corrected for a light source subject Afval_raw: integrated value of contrast evaluation value within AF area Y_nor: fixed value parameter that is a value derived by normalizing brightness value within AF area Y_now: integrated value of brightness evaluation value within AF area area_siza_nor: fixed value parameter, that is a value derived by normalizing number of pixels of AF area area_size: number of pixels of AF area k: correction coefficient, fixed value parameter, written at the manufacturing stage Cutoff frequency coefficients of the respective HPFs, AF area size, brightness correction and correction coefficient etc. described above may be changed to respectively optimal settings for the point light source subject and the high brightness light source subject, or they may be the same.

Also, if, as a result of the flow shown in FIG. 6 two FIG. 9 described above, the subject state is the normal subject state or unclear, AF control such as in (xii) to (xiv) below is carried out.

(xii) Set cutoff frequency coefficient for normal high pass filter.

(xiii) Return AF area size to original.

(xiv) Remove square correction for AF evaluation values of all areas.

As has been described above, with the one embodiment of the present invention, in a state where a point-like light source subject is currently determined (for example, determination of the point light source state in S51 of FIG. 9), in a case where determination of orientation stability indicates unstable, and a photometric value does not indicate low brightness (Yes at S53 in FIG. 9), a subject is determined to be not a point-like light source (for example, S59 in FIG. 9). In this way, it is possible to continue with a determination of a stable point-like light source even if there is a pan or tilt operation at the time of shooting a night scene etc., and it is possible to improve stability of AF control for a light source subject.

Also, with the one embodiment of the present invention, for image signals from an image sensor, first divided areas (for example, finely divided photometry areas) and second divided areas having an area that is larger than the first divided areas (for example, coarsely divided photometry areas) are set (refer, for example, to FIG. 2 to FIG. 4), first photometric values based on image signals corresponding to the first divided areas and second photometric values based on image signals corresponding to the second divided areas are calculated (refer, for example, to S1 and S3 in FIG. 6), and whether or not there is a point light source subject currently determined based on the first photometric values and the second photometric values (for example, S21 in FIG. 7). As a result, it is possible to efficiently and accurately determine a point light source subject in a reduced processing time, compared to determining a point light source by searching for high brightness areas in pixel units.

Also, with the one embodiment of the present invention, threshold values are set for maximum value and minimum value among a plurality of first photometric values, and if second photometric values indicate lower brightness than the threshold values a point light source subject is currently determined (for example, equation (2), S21 in FIG. 7). Since determination threshold values are calculated for in-screen maximum brightness value and minimum brightness value within a taken scene, it is possible to determine optimal threshold values in that taken scene, and it is possible to accurately determine a point light source subject.

Also, with the one embodiment of the present invention, in a case where a difference between maximum value and average value among a plurality of first photometric values is larger than a given value, it is currently determined to not be a point-like light source subject (for example, equation (2) and S25 in FIG. 7). As a result, accurate determination is possible even when it is not a point-like light source subject.

Figure 6:
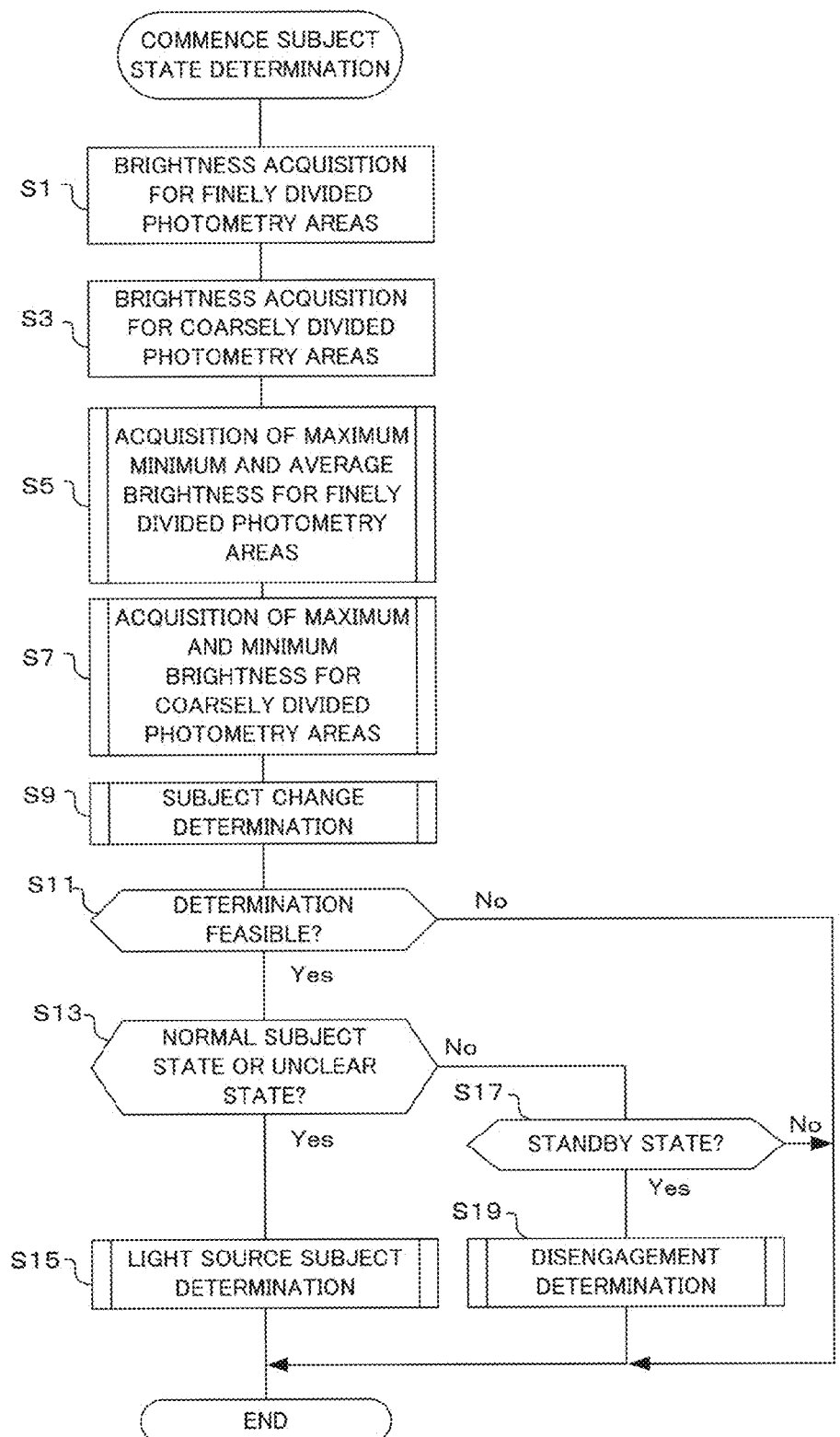
FIG. 6 is a flowchart showing a determination operation for subject state, in the camera of one embodiment of the present invention.
Figure 8:
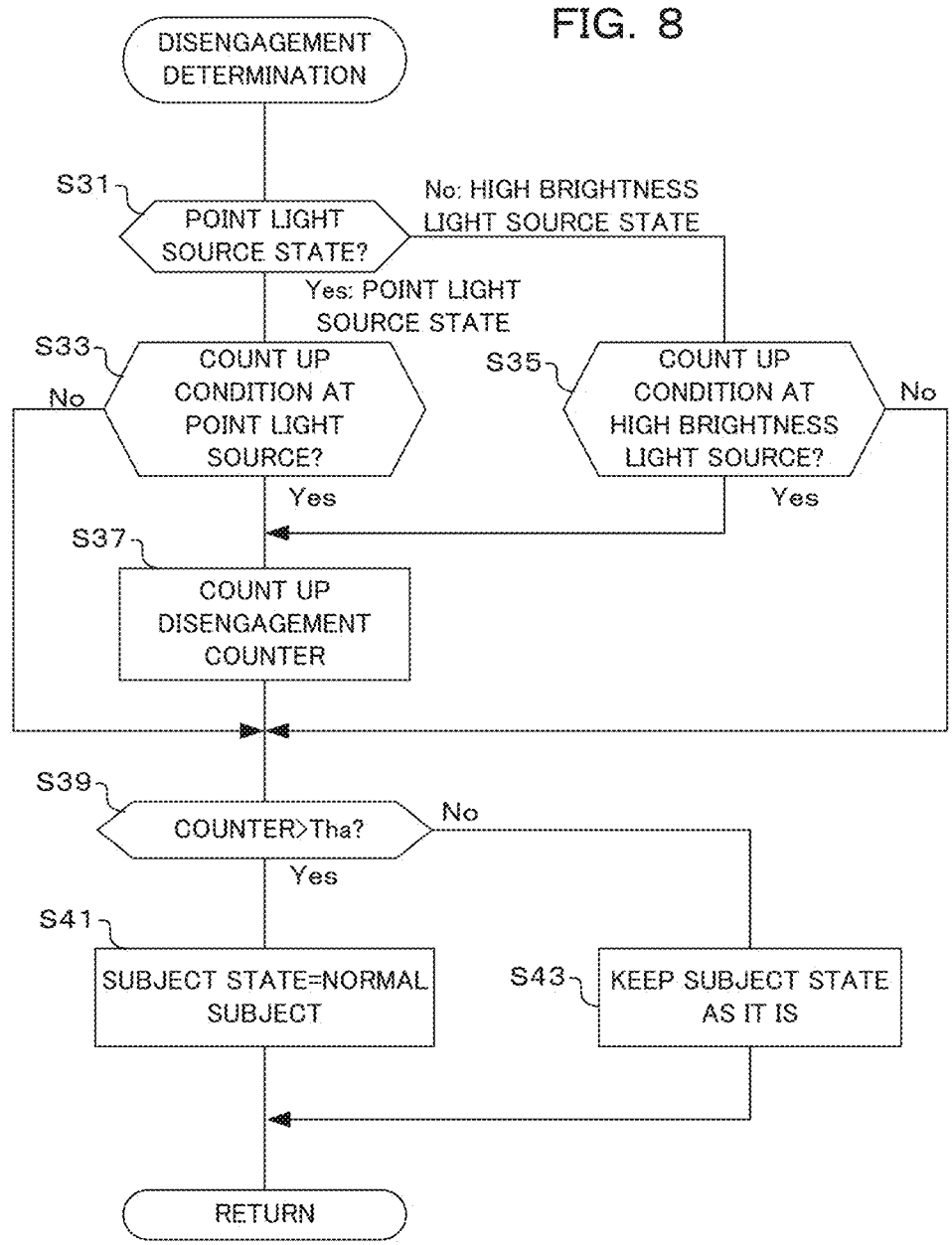
FIG. 8 is a flowchart showing a determination operation for disengagement, in the camera of one embodiment of the present invention.

Also, with the one embodiment of the present invention, for a standby state in which focus detection is carried out with a focus lens stopped (for example, FIG. 5(b) and S17 in FIG. 6), in a case where a state in which subject brightness does not indicate low brightness continues for a given time or longer (for example, S33, S39 Yin FIG. 8) in a state where a point-like light source subject is currently determined (for example, S31 Yes in FIG. 8), it is determined to not be a point-like light source subject (for example, S41 in FIG. 8). In this way, since continuation for a given time or longer can be determined, if it becomes no longer a point-like light source subject during the standby state, the determination is not changed frequently, and it is therefore possible to perform determination accurately and stably.

It should be noted that with the one embodiment of the present invention, when determining a point-like light source or a high brightness light source etc. determination is based on one or a plurality of conditions, but there may be additional determination conditions to those described in the embodiment, or some of those described may be omitted.

Further, with the one embodiment of the present invention, an apparatus for taking pictures has been described using a digital camera, but as a camera it is also possible to use a digital single lens reflex camera or a compact digital camera, or a camera for movie use such as a video camera, and further to have a camera that is incorporated into a mobile phone, a smart phone, a mobile information terminal (PDA: Personal Digital Assistant), personal computer (PC) tablet type computer, game console etc. In any event, the present invention may be adopted in any apparatus that subjects an optical image to photoelectric conversion using an image sensor, and carries out focus adjustment by moving a focus lens based on the resulting signals.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,''element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A focus adjustment device for carrying out focus adjustment by moving a focus lens based on image signals of an image sensor for forming a subject image, comprising:
   a point light source determination section which determines a point-like light source subject based on the image signals,
   an orientation stability determination section which determines stability of orientation by detecting orientation of the focus adjustment device,
   a photometry section which outputs photometric values corresponding to subject brightness based on the image signals, and
   a focus adjustment section which carries out a focus adjustment operation using the image signals, based on a determination result of the point light source determination section, wherein the point light source determination section, in a state where a point-like light source subject is currently determined, when a determination result of the orientation stability determination section indicates unstable and a photometric value output from the photometry section does not indicate low brightness, determines that the subject is not a point-like light source.

2. The focus adjustment device of claim 1, wherein the photometry section comprises
a divided area setting section which sets first divided areas, and second divided areas of larger area than the first divided areas, and
a photometric value calculation section which calculates first photometric values based on image signals corresponding to the first divided areas, and second photometric values based on image signals corresponding to the second divided areas,
wherein the point light source determination section determines whether or not there is a point light source subject based on the first photometric values and the second photometric values.

3. The focus adjustment device of claim 2, wherein the point light source determination section sets threshold values corresponding to maximum value and minimum value among a plurality of the first photometric values, and determines a point light source subject when the second photometric values indicate lower brightness than the threshold values.

4. The focus adjustment device of claim 2, further comprising
a non-point light source determination section for determining a light source that is not a point-like light source based on the image signals,
wherein the non-point light source determination section determines that there is not a point-like light source subject when a difference between maximum value and average value among the plurality of first photometric values is larger than a given value.

5. The focus adjustment device of claim 1,
having a standby state in which focus detection is carried out with the focus lens stopped,
and wherein the point light source determination section, in the standby state, in a case where a state in which output of the photometry section does not indicate low brightness continues for a given time or longer in a state where a point-like light source subject is currently determined, determines that there is not a point-like light source subject.

6. A focus adjustment method, for a focus adjustment device for carrying out focus adjustment by moving a focus lens based on image signals of an image sensor for forming a subject image, comprising:
determining a point-like light source subject based on the image signals,
determining stability of orientation by detecting orientation of the focus adjustment device,
outputting a photometric value corresponding to subject brightness based on the image signals, and
carrying out a focus adjustment operation using the image signals, based on a determination result of the point light source determination section, and
wherein at the time of the point light source subject determination, in a state where a point-like light source subject is being been determined, when a determination result of the orientation stability determination section indicates unstable and a photometric value output from the photometry section does not indicate low brightness, determining that the subject is not a point-like light source.

7. The focus adjustment method of claim 6, wherein
the photometric values are detected
first divided areas are set, and second divided areas of larger area than the first divided areas are set, based on the image signals, and
as the photometric values, first photometric values are calculated based on image signals corresponding to the first divided areas, and second photometric values are calculated based on image signals corresponding to the second divided areas,
wherein determination of the point light source subject is carried out based on the first photometric values and the second photometric values.

8. The focus adjustment method of claim 7, wherein
determination of the point light source is made when setting threshold values corresponding to the maximum value and the minimum value among a plurality of the first photometric values, and the second photometric values indicate lower brightness than the threshold values.

9. The focus adjustment method of claim 7, wherein
non-point light source determination is carried out to determine a light source that is not a point-like light source based on the image signals, and
here, the non-point light source determination determines that there is not a point-like light source subject when a difference between maximum value and average value among the plurality of first photometric values is larger than a given value.

10. The focus adjustment method of claim 6,
having a standby state in which focus detection is carried out with the focus lens stopped,
and wherein determination of the point light source subject, in the standby state, in a case where a state in which a photometric value corresponding to subject brightness does not indicate low brightness continues for a given time or longer in a state where a point-like light source subject is currently determined, determines that there is not a point-like light source subject.

11. A non-transitory computer-readable medium storing a computer program for controlling a computing device that includes a focus adjustment device for carrying out focus adjustment by moving a focus lens based on image signals of an image sensor for forming a subject image, the computer program comprising:
determining a point-like light source subject based on the image signals,
determining stability of orientation by detecting orientation of the focus adjustment device,
outputting photometric values corresponding to subject brightness based on the image signals, and
carrying out a focus adjustment operation using the image signals, based on a determination result of the point light source determination section,
wherein at the time of the point light source subject determination, in a state where a point-like light source subject is currently determined, when a determination result of the orientation stability determination section indicates unstable and a photometric value output from the photometry section does not indicate low brightness, determining that the subject is not a point-like light source.

* * * * *